(12) United States Patent
Russo

(10) Patent No.: US 12,479,488 B2
(45) Date of Patent: Nov. 25, 2025

(54) TRANSPORTATION CART

(71) Applicant: MSI Media, LLC, Nashville, TN (US)

(72) Inventor: Tim Russo, Murfreesboro, TN (US)

( * ) Notice: Subject to any disclaimer, the term of this patent is extended or adjusted under 35 U.S.C. 154(b) by 291 days.

(21) Appl. No.: 18/237,465

(22) Filed: Aug. 24, 2023

(65) Prior Publication Data

US 2025/0065936 A1  Feb. 27, 2025

(51) Int. Cl.
*B62B 3/10* (2006.01)
*B62B 3/00* (2006.01)

(52) U.S. Cl.
CPC .............. *B62B 3/10* (2013.01); *B62B 3/002* (2013.01); *B62B 2501/02* (2013.01)

(58) Field of Classification Search
CPC ....... B62B 3/10; B62B 3/002; B62B 2501/02; B62B 3/108; B62B 2202/30; B62B 3/005; B60P 3/002; B60P 1/56; B65G 49/062
See application file for complete search history.

(56) References Cited

U.S. PATENT DOCUMENTS

| | | | | |
|---|---|---|---|---|
| 2,521,057 | A | * | 9/1950 | Gantz ...................... B62B 3/005 104/258 |
| 2,555,178 | A | * | 5/1951 | Young ...................... B62B 3/02 211/1 |
| 3,999,775 | A | * | 12/1976 | Brongo ..................... B62B 3/02 211/187 |
| 4,986,555 | A | * | 1/1991 | Andreen .................... B62B 3/02 280/47.35 |
| 7,195,257 | B2 | | 3/2007 | Stoneback et al. |
| 7,392,993 | B1 | * | 7/2008 | Prohl ....................... B62B 3/002 280/639 |
| 7,878,338 | B2 | * | 2/2011 | Maxson ................... E04G 5/004 211/41.15 |
| 9,809,241 | B2 | * | 11/2017 | Polidoros ................ B62B 3/108 |

(Continued)

FOREIGN PATENT DOCUMENTS

| | | | | |
|---|---|---|---|---|
| CN | 103964042 | A | * 8/2014 | ............. B65D 85/48 |
| CN | 107953909 | A | * 4/2018 | ............... B62B 5/00 |

(Continued)

OTHER PUBLICATIONS

Corresponding co-pending U.S. Appl. No. 18/122,488, filed Mar. 16, 2023.

(Continued)

*Primary Examiner* — James A Shriver, II
*Assistant Examiner* — Ian Bryce Shelton
(74) *Attorney, Agent, or Firm* — Baker, Donelson, Bearman, Caldwell & Berkowitz, PC; Wesley M. Barbee

(57) ABSTRACT

A transportation cart of the present disclosure may comprise an easel support cage including and at least one paper pad containment cage attached thereto. The easel support cage may include a base frame including a perimeter rail and at least two interior support rails. Four corner posts may extend up from the base frame and each of the four corner posts may be attached to a corner of the base frame. A plurality of wheels may support the easel support cage from a ground surface. A lower containment rail may be located a distance above the base frame and attached to the four corner posts. An upper containment rail may be located a distance above the lower containment rail and attached to the four corner posts.

19 Claims, 18 Drawing Sheets

(56) References Cited

U.S. PATENT DOCUMENTS

| | | | |
|---|---|---|---|
| 9,902,416 B1* | 2/2018 | Dockery | B62B 3/02 |
| 9,908,548 B1* | 3/2018 | Yu | B62B 3/108 |
| 10,150,492 B2* | 12/2018 | Yu | B62B 3/027 |
| 10,214,229 B2 | 2/2019 | Brown | |
| 10,414,421 B1* | 9/2019 | Westmoreland | B62B 3/10 |
| 10,597,057 B1* | 3/2020 | Hilmerson | E04G 5/001 |
| 10,836,415 B1 | 11/2020 | Morrow | |
| 11,161,536 B2* | 11/2021 | Yu | B62B 3/108 |
| 11,718,334 B1* | 8/2023 | Yao | B62B 3/10 |
| | | | 280/47.35 |
| 11,780,485 B2* | 10/2023 | Yu | B62B 3/025 |
| | | | 280/35 |
| 12,012,296 B2* | 6/2024 | Höger | B60P 3/002 |
| 12,252,167 B2* | 3/2025 | Dondek | B62B 3/02 |
| 2001/0005070 A1* | 6/2001 | Kemnitzer | B62B 3/108 |
| | | | 280/79.2 |
| 2003/0006586 A1* | 1/2003 | Comilla | B62B 3/002 |
| | | | 280/651 |
| 2003/0030239 A1* | 2/2003 | Woerner | B62B 3/006 |
| | | | 280/47.35 |
| 2004/0195788 A1 | 10/2004 | Ondrasik et al. | |
| 2006/0103094 A1 | 5/2006 | Wiff et al. | |
| 2007/0262567 A1* | 11/2007 | Benson | E04G 1/34 |
| | | | 280/656 |
| 2009/0194958 A1* | 8/2009 | Lin | B62B 3/16 |
| | | | 280/47.35 |
| 2010/0310346 A1* | 12/2010 | Polidoros | B62B 3/108 |
| | | | 280/79.7 |
| 2015/0041435 A1* | 2/2015 | Gu | C03C 21/002 |
| | | | 427/299 |
| 2018/0154916 A1* | 6/2018 | Yu | B62B 3/027 |
| 2020/0346677 A1* | 11/2020 | Yu | B62B 3/022 |
| 2020/0375120 A1* | 12/2020 | Kaneko | A01G 27/003 |
| 2021/0221625 A1* | 7/2021 | Hötger | B65G 49/062 |
| 2022/0017133 A1* | 1/2022 | Yu | B62B 3/025 |
| 2023/0399039 A1* | 12/2023 | Dondek | B62B 5/00 |
| 2024/0199107 A1* | 6/2024 | Hayward | B62B 5/0447 |

FOREIGN PATENT DOCUMENTS

| | | | | |
|---|---|---|---|---|
| CN | 110053656 A | * | 7/2019 | B62B 3/04 |
| CN | 110466584 A | * | 11/2019 | B62B 3/04 |
| CN | 114394143 A | * | 4/2022 | B62B 3/06 |
| CN | 114426053 A | * | 5/2022 | B62B 3/02 |
| CN | 115520255 A | * | 12/2022 | B66C 5/02 |
| DE | 10051875 A1 | * | 5/2002 | B44D 3/00 |
| DE | 20306133 U1 | * | 6/2003 | B62B 3/108 |
| KR | 200303093 Y1 | * | 2/2003 | A47B 7/04 |
| KR | 101827337 B1 | * | 2/2018 | B62B 3/108 |
| KR | 20180075847 A | * | 7/2018 | B62B 3/02 |
| WO | WO-2018067861 A1 | * | 4/2018 | B62B 3/008 |
| WO | WO-2019219936 A1 | * | 11/2019 | B60P 3/002 |
| WO | WO-2022045692 A1 | * | 3/2022 | B62B 3/002 |

OTHER PUBLICATIONS

Corresponding co-pending U.S. Appl. No. 29/900,704, filed Aug. 24, 2023.

Corresponding co-pending U.S. Appl. No. 29/889,501, filed Apr. 13, 2023.

Corresponding co-pending U.S. Appl. No. 29/889,500, filed Apr. 13, 2023.

Quartet easel; web address captured on Dec. 3, 2023; https://www.quartet.com/p/easels/display-easels/quartet-duramax-presentation-easel-72h-whiteboardflipchart-holder-gray2/.

* cited by examiner

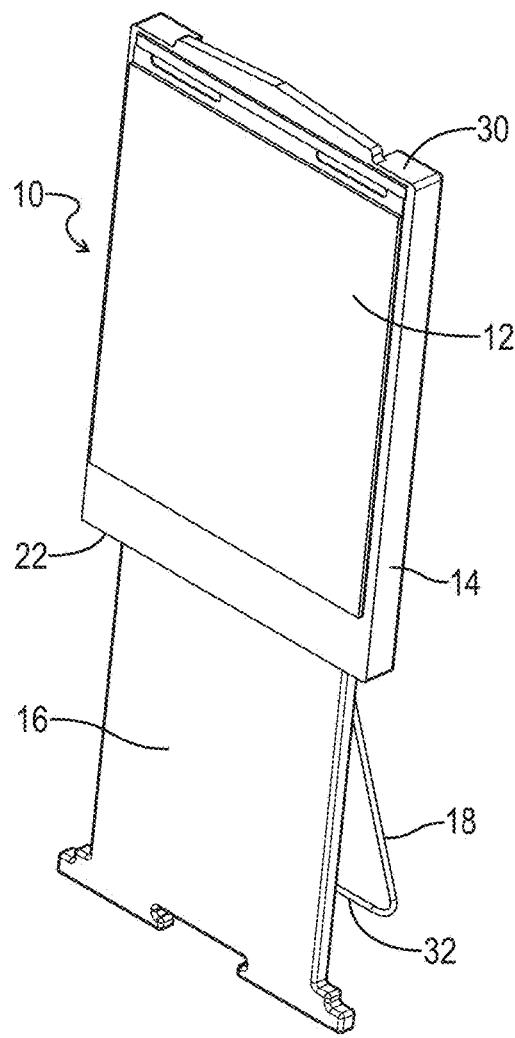
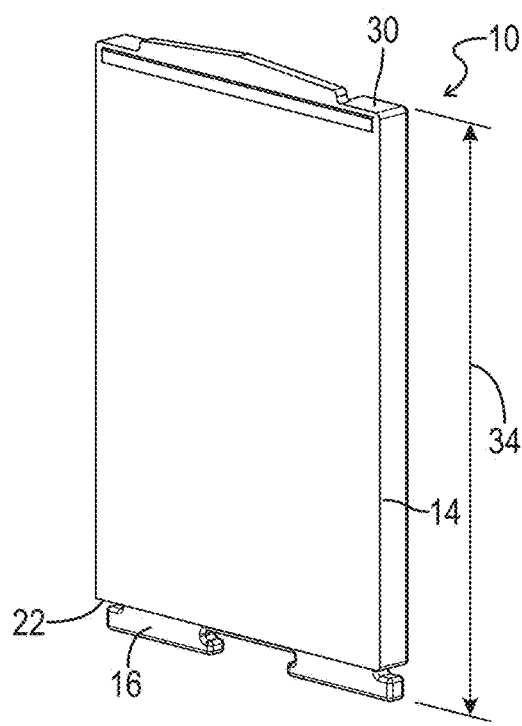
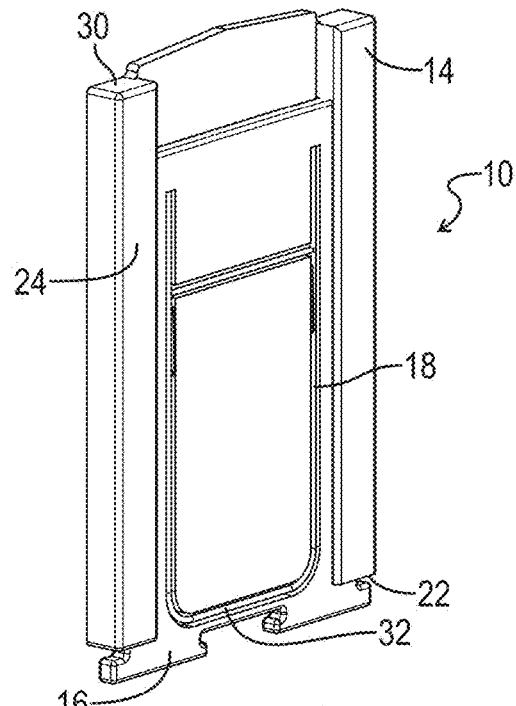
FIG. 1
(PRIOR ART)
FIG. 2
(PRIOR ART)
FIG. 3
(PRIOR ART)

TRANSPORTATION CART

FIELD OF THE DISCLOSURE

The present disclosure relates to transportation carts including, but not limited to, transportation carts configured to transport easels and paper pads.

BACKGROUND

Various pieces of equipment are commonly used in the video, audio, lighting, and production industry, including easels to name an example. Such equipment is often bulky and difficult to transport from one location to another. Often times, such equipment is needed in large quantities resulting in ergonomic issues. For example, such equipment may be needed in a large quantity within a facility for an event. A supplier of such equipment will typically transport the equipment to a facility in a box truck or van, park the box truck or van outside of the facility, and individually transport each article of equipment from the box truck or van into the facility. Thus, additional workers may need to be hired or the process may take a single worker an extended period of time.

FIGS. 1-3 illustrate a conventional easel, generally designated by the number 10. Conventional easels 10 are configured to selectively receive a paper pad 12. Specifically, each easel 10 is configured such that a paper pad 12 may be clipped to it, thus providing a user a flat surface against which to write on the paper pad 12. The easel 10 includes a base structure 14, a first support 16, and a second support 18. The base structure 14 includes a recess in a lower end 22 of the base structure 14 that is operable to slidably receive the first support 16. The first support 16 may be selectively extended from the recess. The second support 18 is pivotally connected to a back side of the base structure 14 via at least one pivotal connection. The second support 18 may be translated relative to the base structure 14. The at least one pivotal connection is operable to be translated a distance between the lower end of the base structure 14 and an upper end 30 of the base structure 14. Thus, when the at least one pivotal connection is translated relative to the base structure 14, the second support 18 is translated relative to the base structure 14.

The easel 10 is operable in at least a transportation configuration and a use configuration. In the transportation configuration, the first support 16 is at least partially received within the recess of the base structure 14, the pivotal connections are nearer to the upper end 30 of the base structure 14 than the lower end 22 of the base structure 14, and a ground engaging portion 32 of the second support 18 is folded against a back side 24 of the base structure 14. The conventional easel 10 may have a reduced height 34 in the transportation configuration. The conventional easel 10 is shown in the transportation configuration in FIGS. 2 and 3.

In the use configuration, the first support 16 is at least partially extended from the recess of the base structure 14, the pivotal connections are nearer to the lower end 22 of the base structure 14 than the upper end 30 of the base structure 14, and the ground engaging portion 32 of the second support 18 is pivoted away from the base structure 14. The conventional easel 10 is shown in the use configuration in FIG. 1.

Many use cases require a plurality of conventional easels 10 along with a plurality of paper pads 12. While one advantage of the transportation configuration of the conventional easel 10 may be making the conventional easel 10 easier to transport and store, a human operator may find it difficult to transport a plurality of the conventional easels 10, and a plurality of paper pads 12 for that matter, at one time.

SUMMARY OF THE DISCLOSURE

Accordingly, a need exists to provide a transportation cart for transporting easels and paper pads. A new transportation cart is disclosed herein.

One aspect in accordance with the optional embodiments disclosed herein is a transportation cart configured to transport a plurality of easels. The transportation cart comprises an easel support cage and at least one paper pad containment cage. The easel support cage includes a base frame, four corner posts, a plurality of wheels, a lower containment rail, and an upper containment rial. The base frame includes a perimeter rail and at least two interior support rails. The four corner posts extend up from the base frame. Each of the four corner posts may be attached to a corner of the base frame. The plurality of wheels support the easel support cage from a ground surface. The lower containment rail may be located a distance above the lower containment rail and may be attached to the four corner posts. The at least one paper pad containment cage may be attached to the easel support cage and may be operable to support at least one paper pad. A length of the easel support cage may be at least six (6) times a distance that the at least one paper pad containment cage extends from the easel support cage.

In certain optional embodiments in accordance with this aspect, the easel support cage includes first and second vertical supports and a lateral support stop. The first and second vertical supports extend from the perimeter rail of the base frame to the lower containment rail. The lateral support stop extends from the first vertical support to the second vertical support.

In certain optional embodiments in accordance with this aspect, the at least one paper pad containment cage includes a bottom perimeter, two vertical posts, a middle perimeter rail, a top perimeter rail, at least two lateral supports, and at least two vertical supports. The two vertical posts extend up from the bottom perimeter rail. Each of the two vertical posts may be attached to a corner of the bottom perimeter rail. The middle perimeter rail may be located a distance above the bottom perimeter rail and may be attached to the two vertical posts. The top perimeter rail may be located above the middle perimeter rail and may be attached to the two vertical posts. The at least two lateral supports may extend from the easel support cage to the bottom perimeter rail. The at least two vertical supports may extend from the bottom perimeter rail to the middle perimeter rail.

In certain optional embodiments in accordance with this aspect, the bottom perimeter rail of the paper pad containment cage may be connected to the base frame of the easel support cage, the middle perimeter rail of the paper pad containment cage may be connected to the lower containment rail of the easel support cage, and the top perimeter rail of the paper pad containment cage may be connected to the upper containment rail of the easel support cage.

In certain optional embodiments in accordance with this aspect, the transportation cart further comprises a handle coupled to the easel support cage.

In certain optional embodiments in accordance with this aspect, the lower containment rail of the easel support cage may have an opening width in a range of from 24 inches to 36 inches.

In certain optional embodiments in accordance with this aspect, the lower containment rail of the easel support cage may have an opening width in a range of from 14 inches to 26 inches.

In certain optional embodiments in accordance with this aspect, the lower containment rail of the easel support cage may have an opening length in a range of from 34 inches to 46 inches.

In certain optional embodiments in accordance with this aspect, the lower containment rail of the easel support cage may have an opening length in a range of from 24 inches to 36 inches.

In certain optional embodiments in accordance with this aspect, the upper containment rail of the easel support cage may have an opening width in a range of from 24 inches to 36 inches.

In certain optional embodiments in accordance with this aspect, the upper containment rail of the easel support cage may have an opening width in a range of from 14 inches to 26 inches.

In certain optional embodiments in accordance with this aspect, the upper containment rail of the easel support cage may have an opening length in a range of from 34 inches to 46 inches.

In certain optional embodiments in accordance with this aspect, the upper containment rail of the easel support cage may have an opening length in a range of from 24 inches to 36 inches.

In certain optional embodiments in accordance with this aspect, a distance between the base frame of the easel support cage and the upper containment rail of the easel support cage may be in a range of from 26 inches to 38 inches.

In certain optional embodiments in accordance with this aspect, a length of the base frame of the easel support cage, a length of the lower containment rail of the easel support cage, and a length of the upper containment rail of the easel support cage are each equal and a width of the base frame of the easel support cage, a width of the lower containment rail of the easel support cage, and a width of the upper containment rail of the easel support cage are each equal.

In certain optional embodiments in accordance with this aspect, the easel support cage further incudes an upper containment rail lateral support stop extending from a first lengthwise side of the upper containment rail to a second lengthwise side of the upper containment rail.

In certain optional embodiments in accordance with this aspect, a length of the at least one paper pad containment cage is in a range of from 1 inches to 7 inches.

In certain optional embodiments in accordance with this aspect, the at least one paper pad containment cage has a width in a range of from 24 inches to 36 inches.

In certain optional embodiments in accordance with this aspect, the transportation cart further comprises at least one easel supported by the easel support cage. The lateral support stop is configured to restrict movement of the at least one easel.

In certain optional embodiments in accordance with this aspect, the transportation cart further comprises at least one paper pad supported by the at least one paper pad containment cage.

Numerous objects, features and advantages of the present invention will be readily apparent to those skilled in the art upon a review of following description in conjunction with the accompanying drawings.

BRIEF DESCRIPTION OF THE DRAWINGS

FIG. 1 is a front left perspective view of a conventional easel of the prior art.

FIG. 2 is a front left perspective view of the conventional easel of FIG. 1.

FIG. 3 is a left rear perspective view of the commercial easel of FIG. 1.

DETAILED DESCRIPTION

Figure 4:
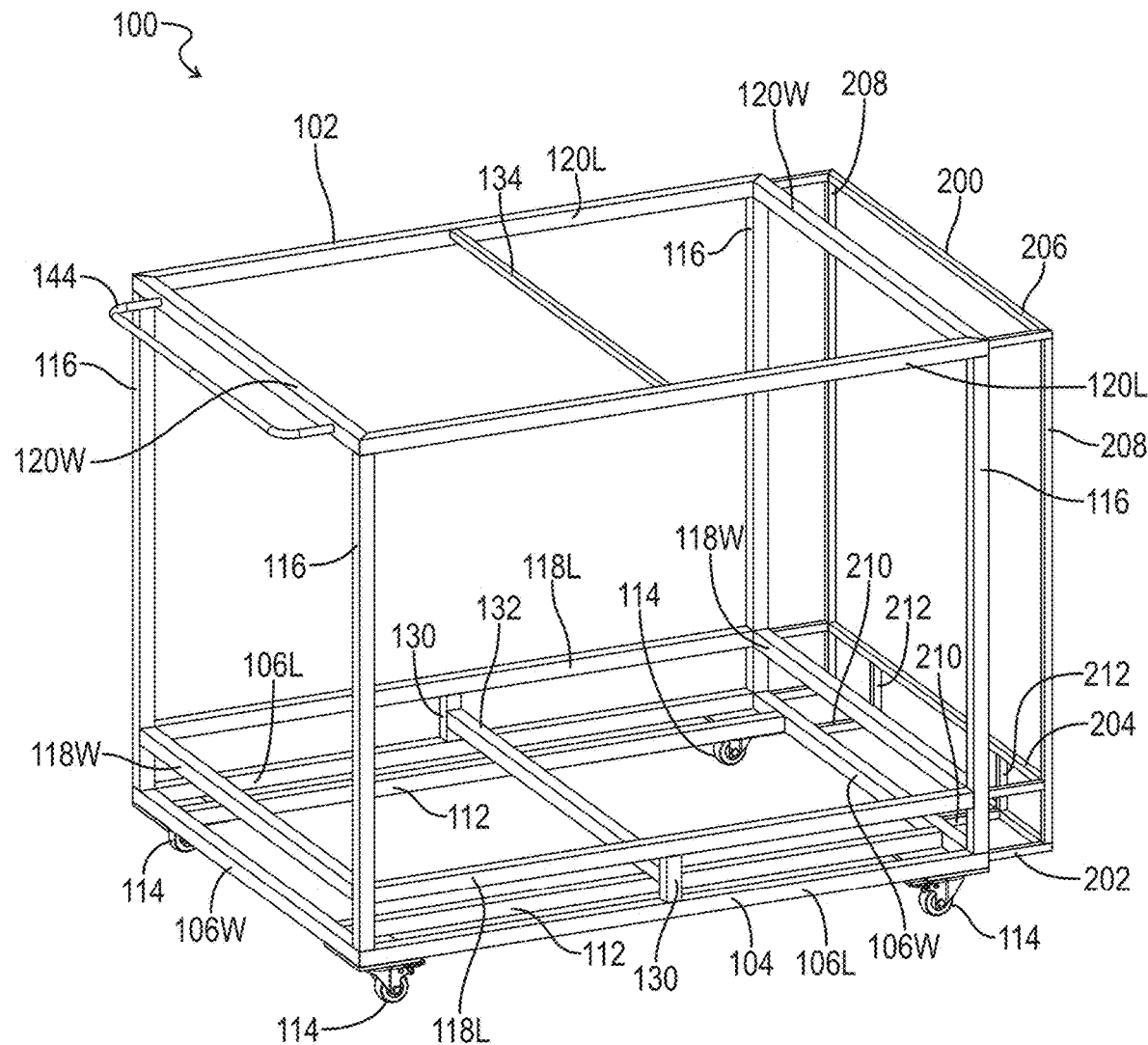
FIG. 4 is a perspective view of an optional embodiment of a transportation cart in accordance with the present disclosure.

Reference will now be made in detail to embodiments of the present disclosure, one or more drawings of which are set forth herein. Each drawing is provided by way of explanation of the present disclosure and is not a limitation.

In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof. Furthermore, any part of the apparatus of the present disclosure may be made using any applicable manufacturing method, such as, but not limited to 3D printing, injection molding, or the like.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

The words "vertical" and "horizontal" are used for clarity of language to aid in understanding the disclosure. These words are in reference to orientations of the components when being viewed in an upright position and do not limit any of the claims to only the upright position. Vertical may, in some embodiments, be associated with an axis along the direction of gravity. Horizontal, then, may be associated with an axis that is perpendicular thereto. The terms substantially vertical and substantially horizontal may refer to a range that is about true vertical and true horizontal.

Referring now to the drawings and particularly to FIGS. 4-10, a transportation cart is shown and generally designated by the number 100. The transportation cart 100 may be configured to transport one or more conventional easels 10 and one or more paper pads 12. The transportation cart 100 may be configured to transport as many as twelve (12) conventional easels 10 or as few as one (1) conventional easel 10.

The transportation cart 100 includes an easel support cage 102. The easel support cage 102 may include a base frame 104. The base frame 104 may include a perimeter rail 106 arranged in a generally rectangular layout. The perimeter rail 106 may include two lengthwise rail sections generally designated by the number 106L and two widthwise rail sections generally designated by the number 106W.

Figure 5:
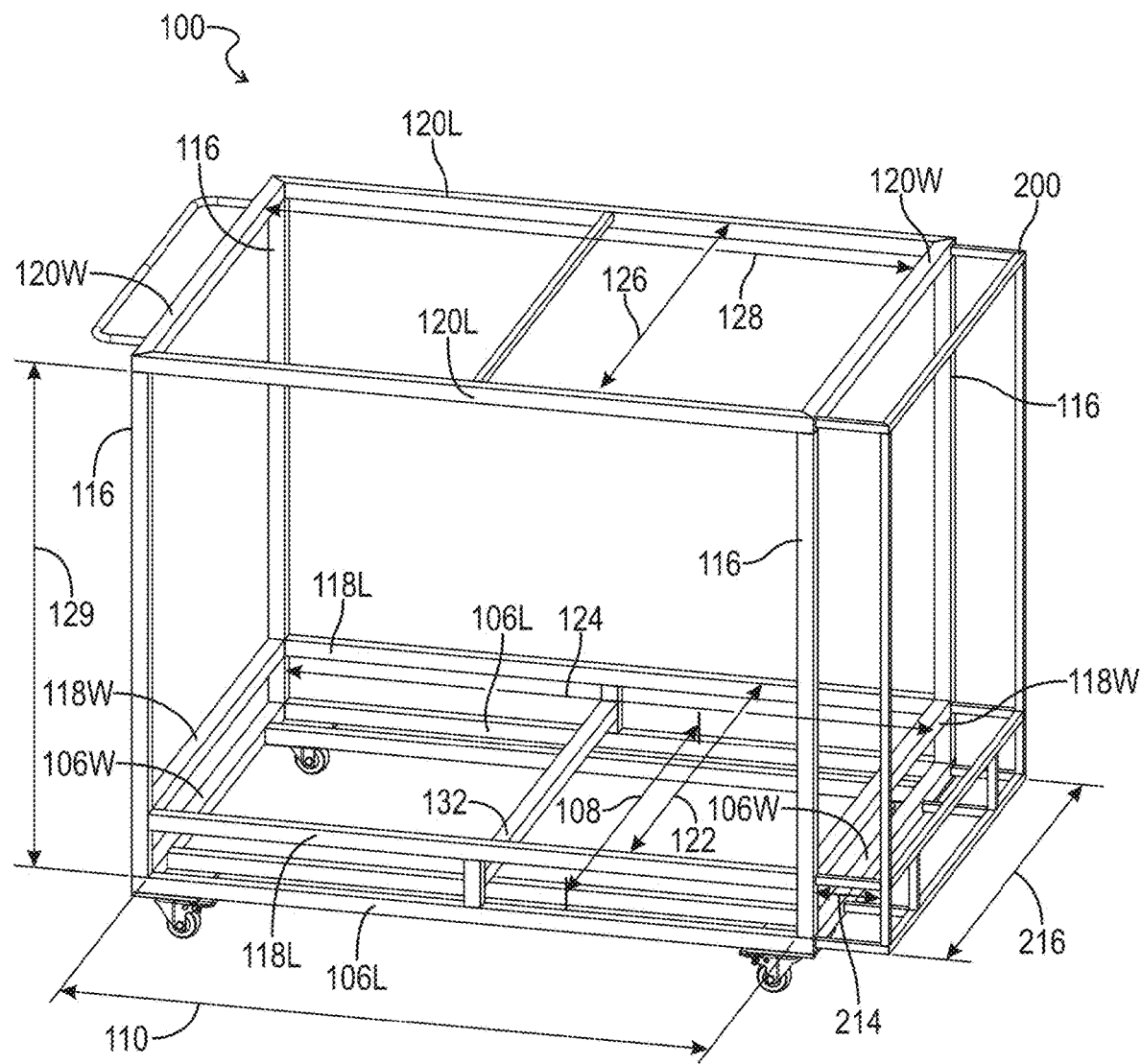
FIG. 5 is a perspective view of the transportation cart of FIG. 4 in accordance with the present disclosure.
Figure 6:
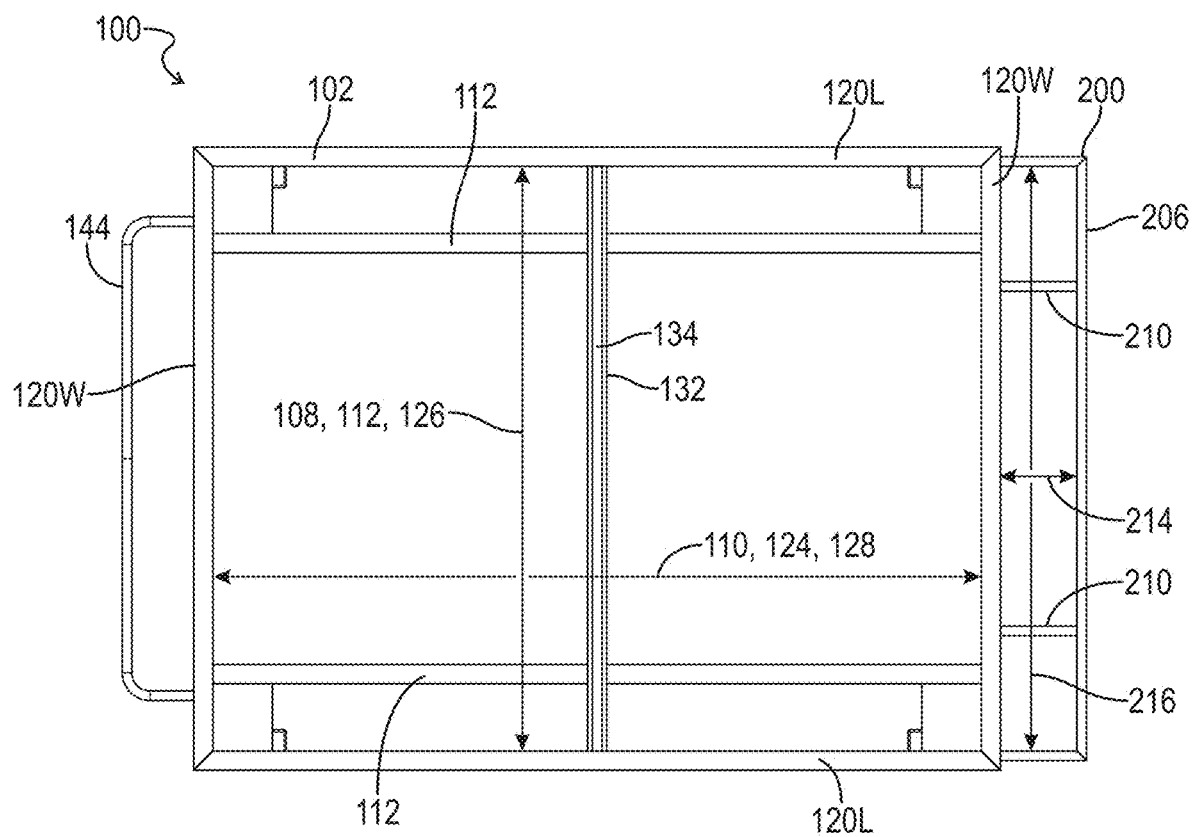
FIG. 6 is a top view of the transportation cart of FIG. 4 in accordance with the present disclosure.
Figure 7:
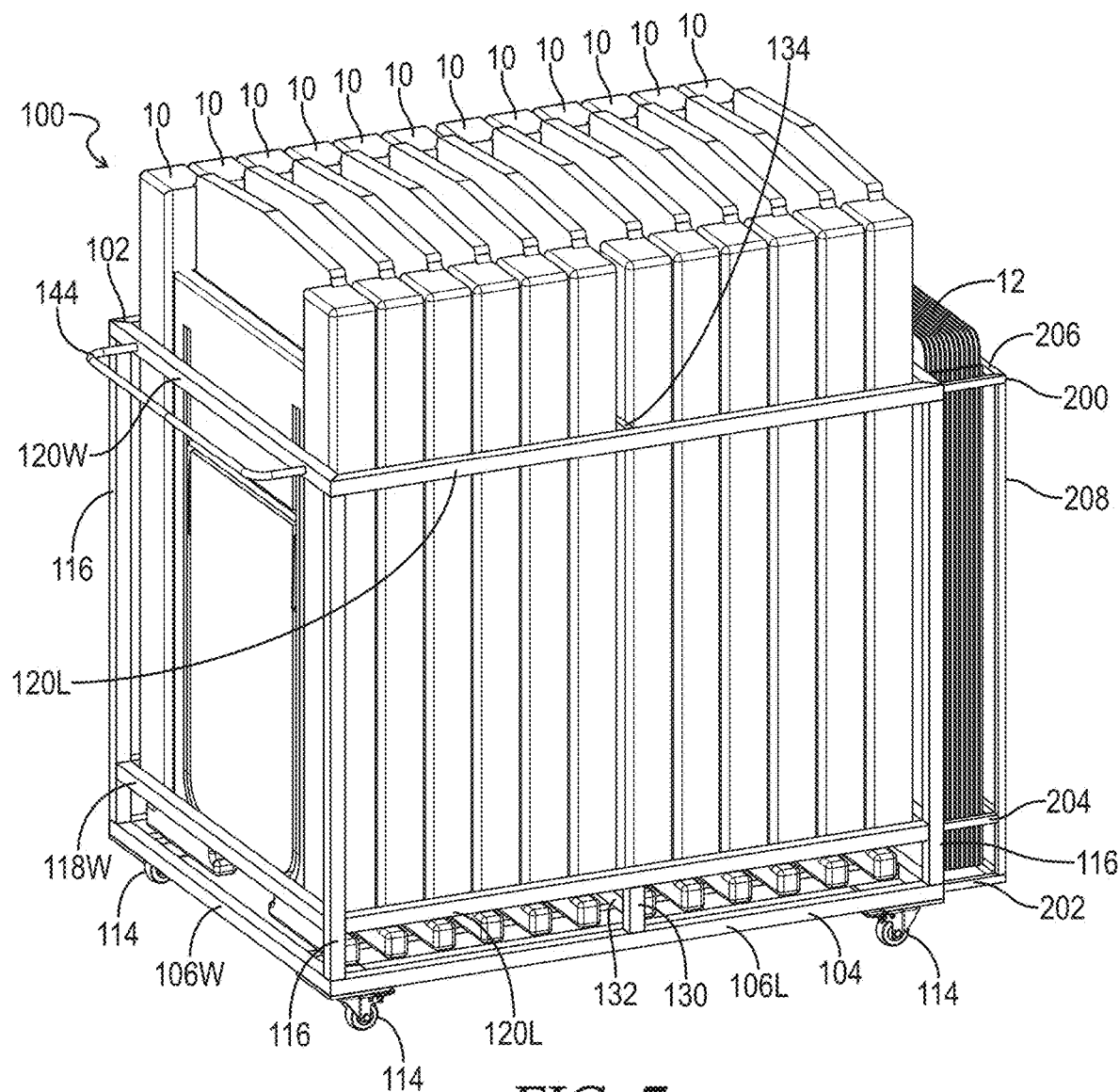
FIG. 7 is a perspective view of the transportation cart of FIG. 4 in accordance with the present disclosure wherein the transportation cart is supporting a plurality of conventional easels and paper pads.
Figure 8:
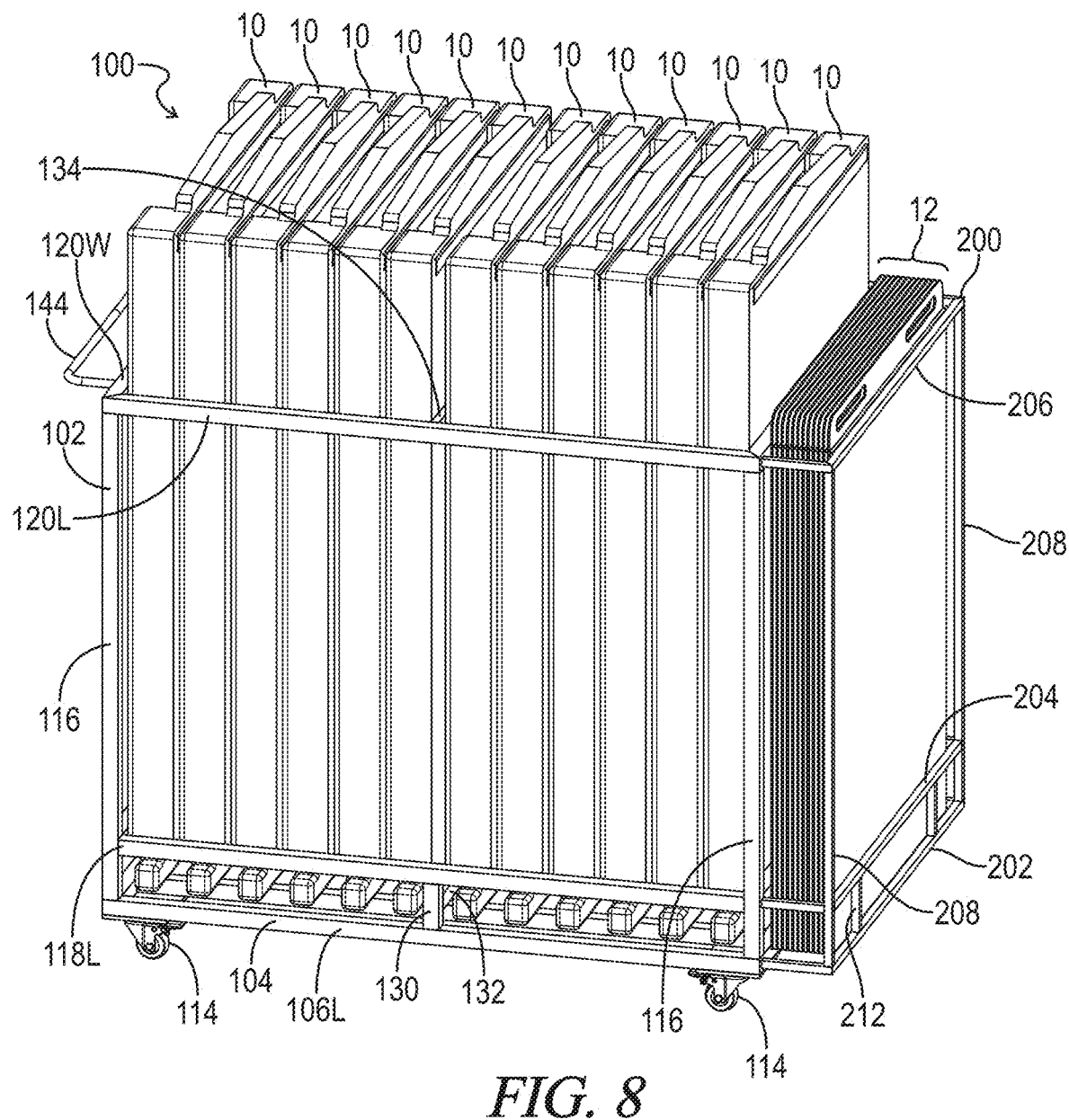
FIG. 8 is a perspective view of the transportation cart of FIG. 4 in accordance with the present disclosure wherein the transportation cart is supporting the plurality of conventional easels and paper pads.
Figure 9:
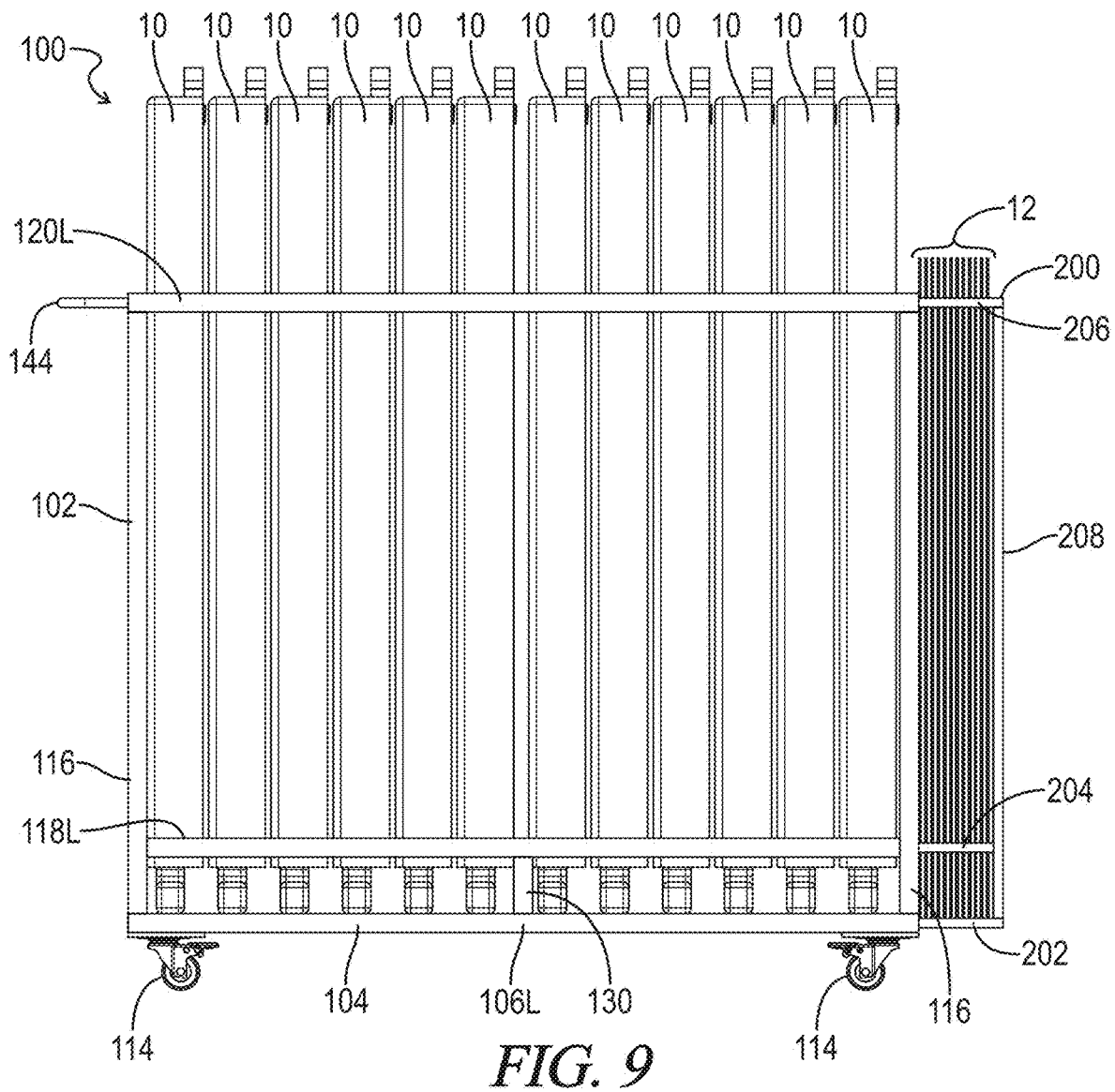
FIG. 9 is a side view of the transportation cart of FIG. 4 in accordance with the present disclosure wherein the transportation cart is supporting the plurality of conventional easels and paper pads.
Figure 10:
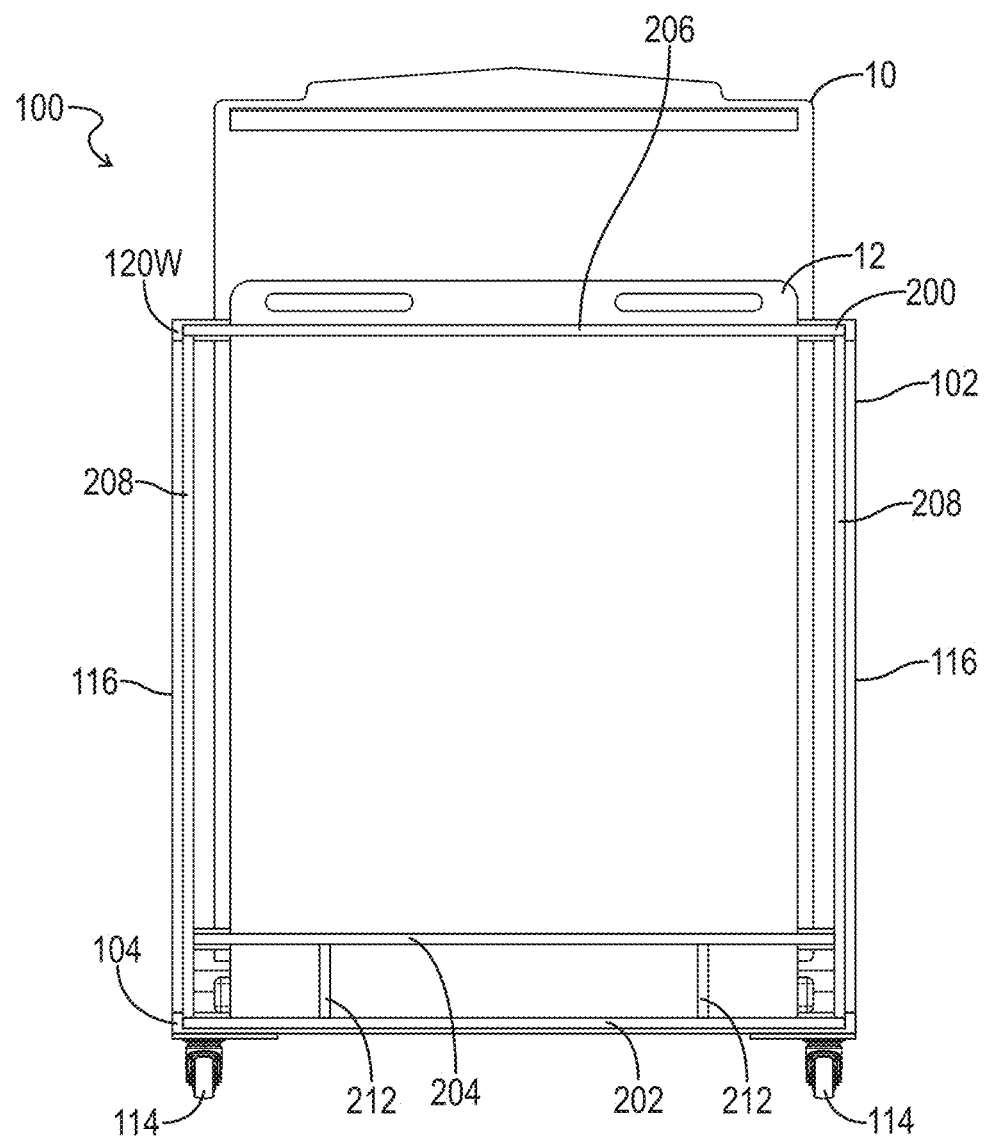
FIG. 10 is a front view of the transportation cart of FIG. 4 in accordance with the present disclosure wherein the transportation cart is supporting a plurality of conventional easels and paper pads.
Figure 11:
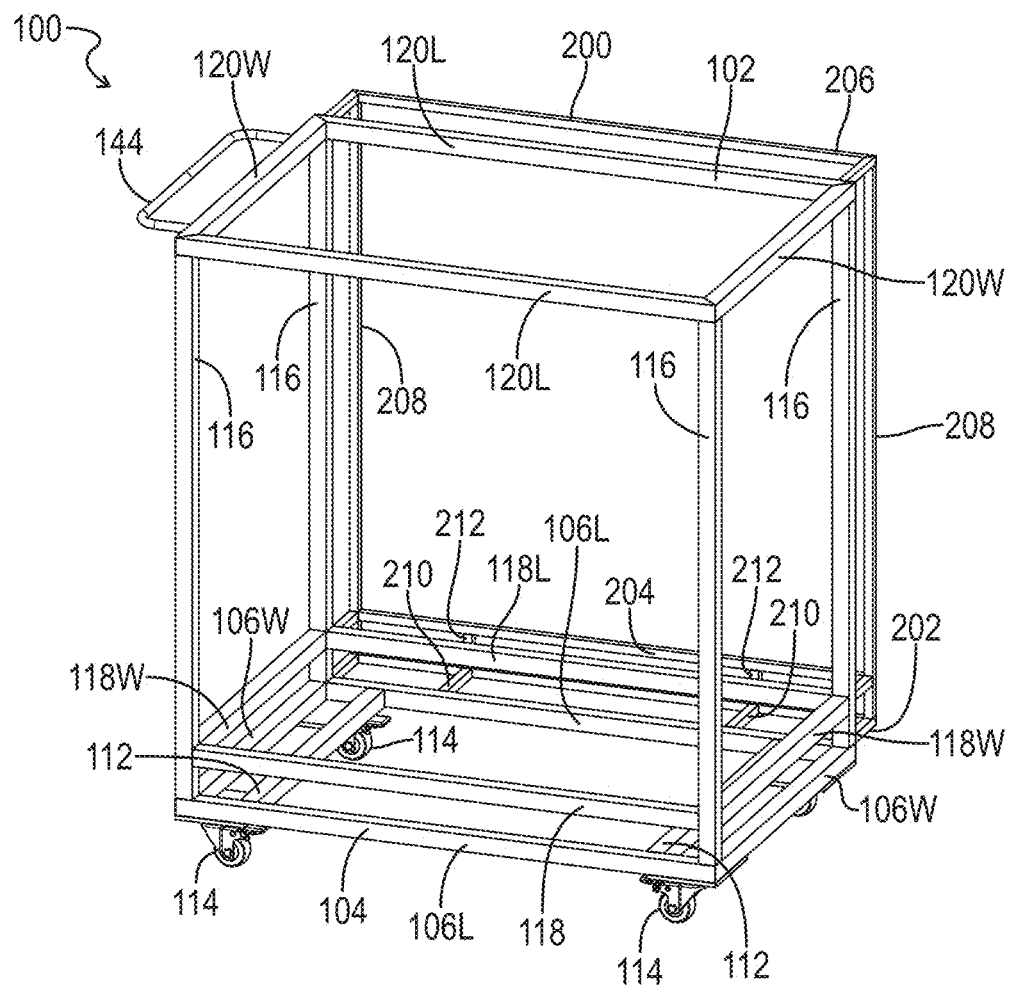
FIG. 11 is a perspective view of another optional embodiment of a transportation cart in accordance with the present disclosure.
Figure 12:
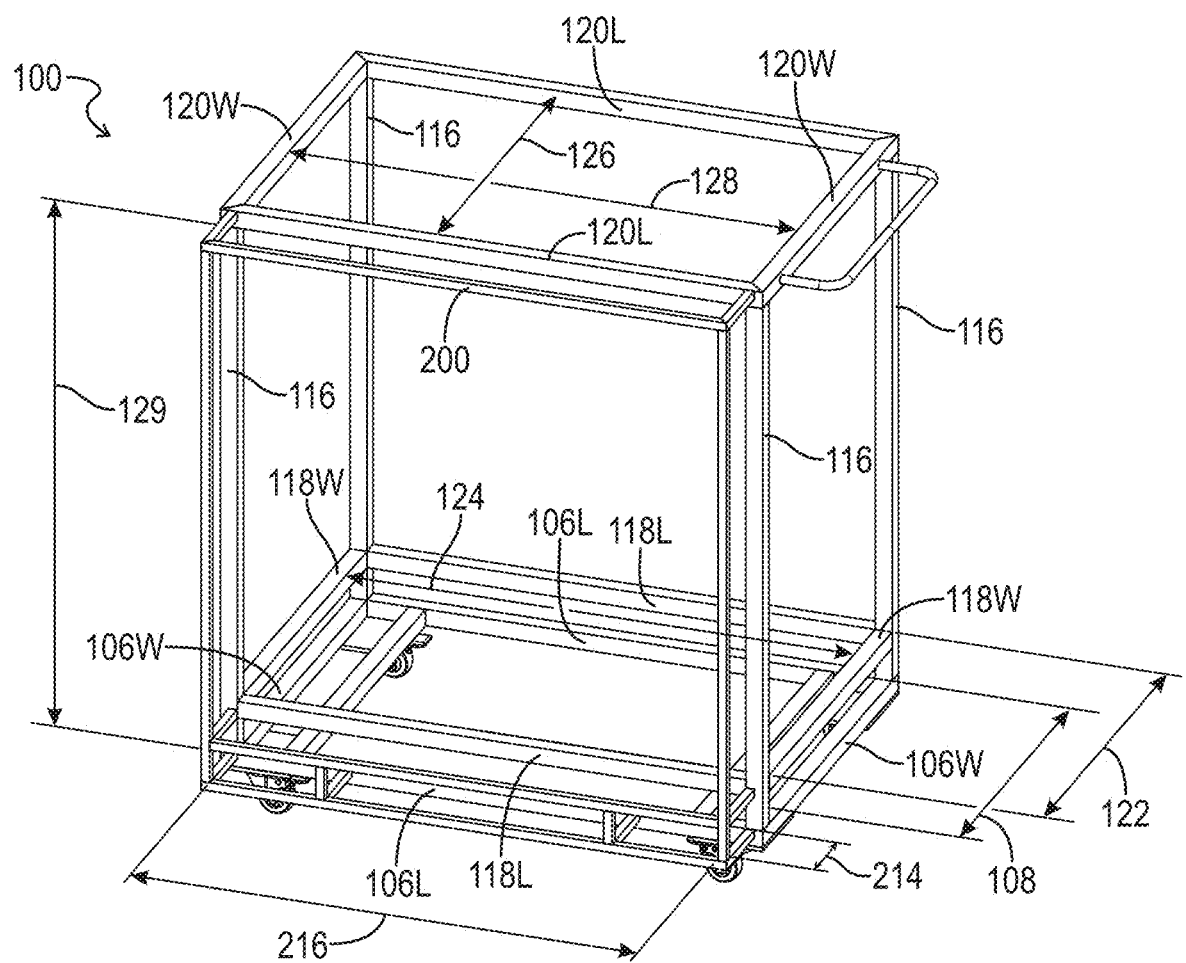
FIG. 12 is a perspective view of the transportation cart of FIG. 11 in accordance with the present disclosure.
Figure 13:
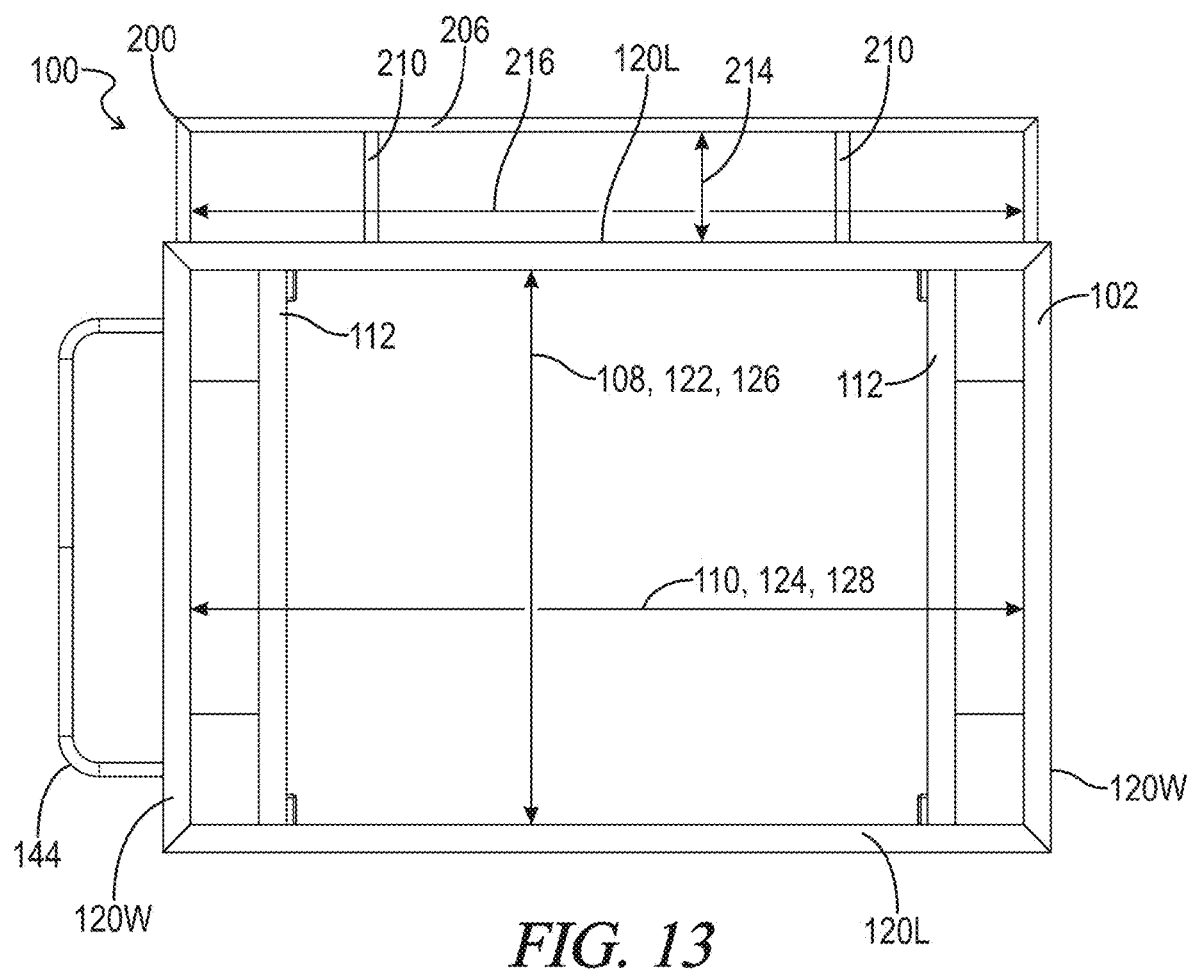
FIG. 13 is a top view of the transportation cart of FIG. 11 in accordance with the present disclosure.
Figure 14:
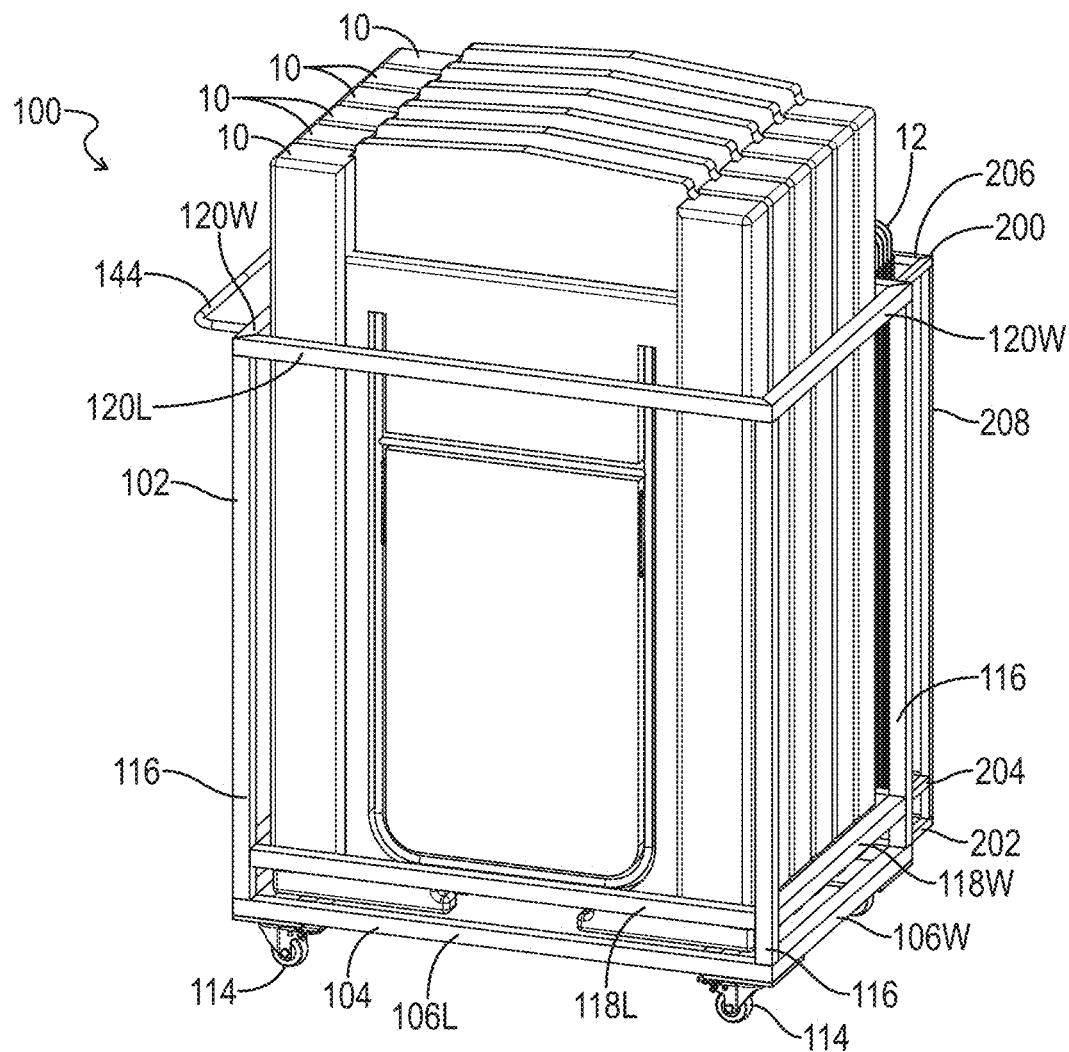
FIG. 14 is a perspective view of the transportation cart of FIG. 11 in accordance with the present disclosure wherein the transportation cart is supporting a plurality of conventional easels and paper pads.
Figure 15:
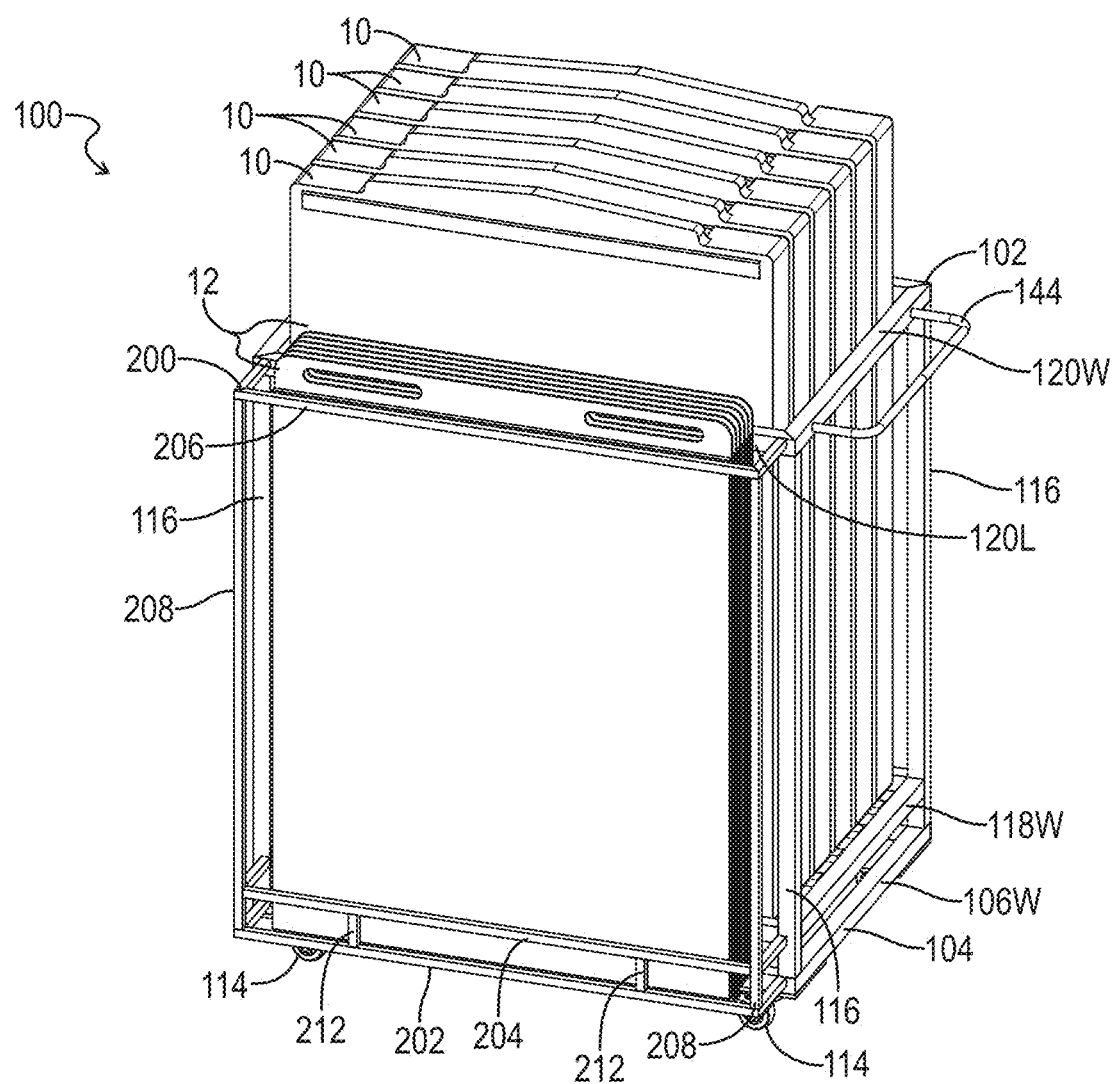
FIG. 15 is a perspective view of the transportation cart of FIG. 11 in accordance with the present disclosure wherein the transportation cart is supporting the plurality of conventional easels and paper pads.
Figure 16:
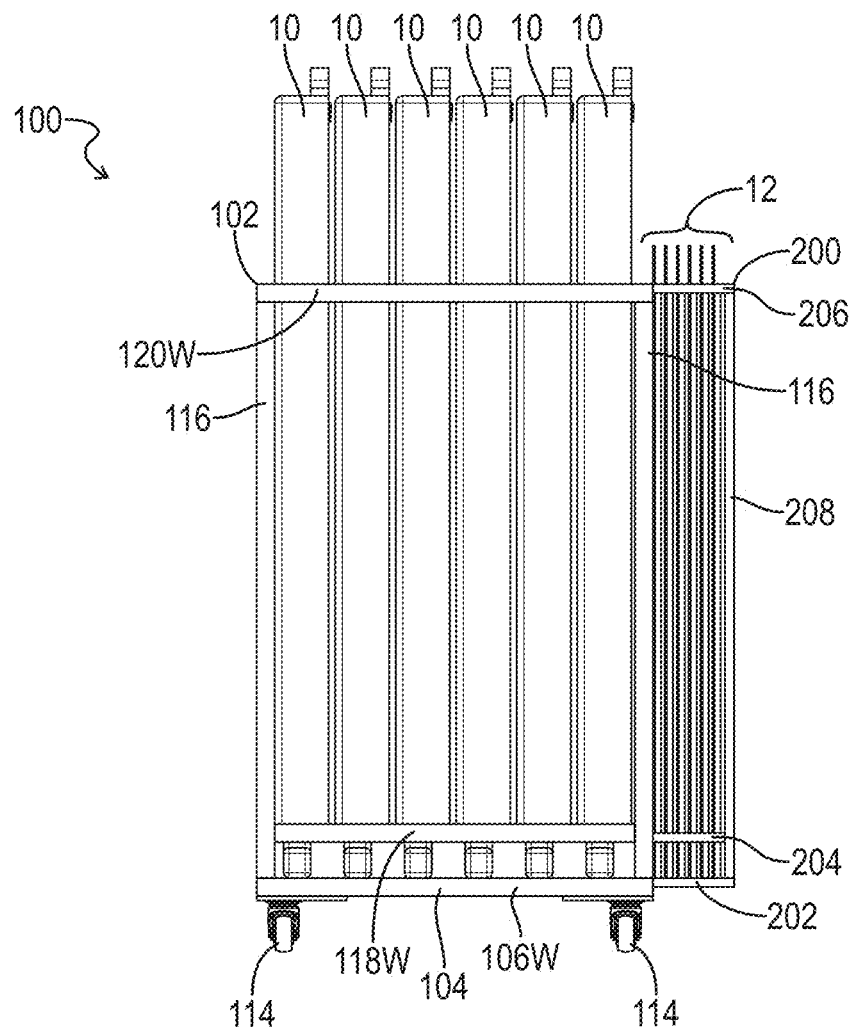
FIG. 16 is a side view of the transportation cart of FIG. 11 in accordance with the present disclosure wherein the transportation cart is supporting the plurality of conventional easels and paper pads.

Referring now to FIGS. 11-16, in one optional embodiment, such as an embodiment operable to hold up to six (6) conventional easels 10, an opening distance between the two lengthwise rail sections 106L may be in a range of from 14 inches to 26 inches, preferably from 16 inches to 24 inches, and most preferably from 18 inches to 22 inches. The opening distance between the two lengthwise rail sections 106L may be referred to as a width 108 of the base frame 104. Referring now to FIGS. 4-6, in another optional embodiment, such as an embodiment operable to hold up to twelve (12) conventional easels 10, the width 108 of the base frame 104 may be in a range of from 24 inches to 36 inches, preferably from 26 inches to 34 inches, and most preferably from 28 inches to 32 inches.

In the optional embodiment operable to hold up to six (6) conventional easels 10, an opening distance between the two widthwise rails sections 106W may be in a range of from 24 inches to 36 inches, preferably from 26 inches to 34 inches, and most preferably from 28 inches to 32 inches. The opening distance between the two widthwise rail sections 106W may be referred to as a length 110 of the base frame 104. In the optional embodiment operable to hold up to twelve (12) conventional easels 10, the length 110 of the base frame 104 may be in a range of from 34 inches to 46 inches, preferably from 36 inches to 44 inches, and most preferably from 38 inches to 42 inches.

The base frame 104 further includes at least two interior support rails 112. The at least two interior support rails 112 may be operable to at least support one or more conventional easels 10 placed in the easel support cage 102. In the optional embodiment operable to hold up to six (6) conventional easels 10, the at least two interior support rails 112 may extends between the lengthwise rail sections 106L. An opening distance between a single interior support rail 112 and the respective widthwise rail section 106W it is closest to may be in a range of from 1 inch to 6 inches, preferably from 2 inches to 5 inches, and most preferably from 3 inches to 4 inches. In the optional embodiment operable to hold up to twelve (12) conventional easels 10, the at least two interior support rails 112 may extend between the two widthwise rail sections 106W. An opening distance between a single interior support rail 112 and the respective lengthwise rail section 106L it is closest to may be in a range of from 1 inch to 6 inches, preferably from 2 inches to 5 inches, and most preferably from 3 inches to 4 inches.

The easel support cage 102 includes a plurality of wheels 114 for supporting the easel support cage 102 from a ground surface. Each of the plurality of wheels 114 may be coupled at or near a corner of the base frame 104 of the easel support cage 102. The plurality of wheels 114 may be caster wheels that are operable to support heavy loads, or any other wheel that provides rolling support to the easel support cage 102.

The easel support cage 102 includes four corner posts 116 extending up from the base frame 104, a lower containment rail 118, and an upper containment rail 120. Each of the four corner posts 116 may be attached to a corner of the base frame 104. The lower containment rail 118 may be located a distance above the base frame 104, be attached to the four corner posts 116, and include two lengthwise rail sections generally designated by the number 118L and two widthwise rail sections generally designated by the number 118W. The upper containment rail 120 may be located a distance above the lower containment rail 118, be attached to the four corner posts 116, and include two lengthwise rail sections generally designated by the number 120L and two widthwise rail sections generally designated by the number 120W.

In the optional embodiment operable to hold up to six (6) conventional easels 10, an opening distance between the two lengthwise rail sections 118L may be in a range of from 14 inches to 26 inches, preferably from 16 inches to 24 inches, and most preferably from 18 inches to 22 inches. The opening distance between the two lengthwise rail sections 118L may be referred to as a width 122 of the lower containment rail 118. In the optional embodiment operable to hold up to twelve (12) conventional easels 10, the width 122 of the lower containment rail 118 may be in a range of from 24 inches to 36 inches, preferably from 26 inches to 34 inches, and most preferably from 28 inches to 32 inches.

In the optional embodiment operable to hold up to six (6) conventional easels 10, an opening distance between the two widthwise rails sections 118W may be in a range of from 24 inches to 36 inches, preferably from 26 inches to 34 inches, and most preferably from 28 inches to 32 inches. The opening distance between the two widthwise rail sections 118W may be referred to as a length 124 of the lower containment rail 118. In the optional embodiment operable to hold up to twelve (12) conventional easels 10, the length 124 of the lower containment rail 118 may be in a range of from 34 inches to 46 inches, preferably from 36 inches to 44 inches, and most preferably from 38 inches to 42 inches.

In the optional embodiment operable to hold up to six (6) conventional easels 10, an opening distance between the two lengthwise rail sections 120L may be in a range of from 14 inches to 26 inches, preferably from 16 inches to 24 inches, and most preferably from 18 inches to 22 inches. The opening distance between the two lengthwise rail sections 120L may be referred to as a width 126 of the upper containment rail 120. In the optional embodiment operable to hold up to twelve (12) conventional easels 10, the width 126 of the upper containment rail 120 may be in a range of from 24 inches to 36 inches, preferably from 26 inches to 34 inches, and most preferably from 28 inches to 32 inches.

In the optional embodiment operable to hold up to six (6) conventional easels 10, an opening distance between the two widthwise rails sections 120W may be in a range of from 24 inches to 36 inches, preferably from 26 inches to 34 inches, and most preferably from 28 inches to 32 inches. The opening distance between the two widthwise rail sections 120W may be referred to as a length 128 of the upper containment rail 120. In the optional embodiment operable to hold up to twelve (12) conventional easels 10, the length 128 of the upper containment rail 120 may be in a range of from 34 inches to 46 inches, preferably from 36 inches to 44 inches, and most preferably from 38 inches to 42 inches.

The length 110 of the base frame 104, the length 124 of the lower containment rail 118, and the length 128 of the upper containment rail 120 may each be equal and the width 108 of the base frame 104, the width 122 of the lower containment rail 118, and the width 126 of the upper containment rail 120 may each be equal such that the easel support cage 102 is generally a rectangular prism. In optional embodiments where this is the case, the easel support cage 102 may have an overall length that is equal to the length 124 of the lower containment rail 118, and the length 128 of the upper containment rail 120 and an overall width that is equal to the width 108 of the base frame 104, the width 122 of the lower containment rail 118, and the width 126 of the upper containment rail 120.

In optional embodiments, such as the embodiment operable to hold up to six (6) conventional easels 10 or the embodiment operable to hold up to twelve (12) conventional easels 10, a distance between the base frame 104 and the lower containment rail 118 is in a range of from 1 inch to 4 inches, but preferably in a range of from 1 inch to 3 inches. In optional embodiments, such as the embodiment operable to hold up to six (6) conventional easels 10 or the embodiment operable to hold up to twelve (12) conventional easels 10, a distance between the base frame 104 and the upper containment rail 120 is in a range of from 26 inches to 38 inches, preferably from 28 inches to 36 inches, and most preferably from 30 inches to 34 inches. This distance may be referred to as a height 129 of the easel support cage 102.

In the embodiment operable to hold up to twelve (12) conventional easels 10, the easel support cage 102 may include first and second vertical supports generally designated by the number 130. Each of the first and second vertical supports 130 extend up from the perimeter rail 106 of the base frame 104 to the lower containment rail 118. Specifically, each of the first and second vertical supports 130 extend up from the lengthwise rail sections 106L of the base frame 104 to the lengthwise rail sections 118L of the lower containment rail 118. The first and second vertical supports 130 may be located generally halfway between the widthwise rail sections 106W of the base frame 104. The easel support cage 102 may further include a lateral support stop 132 extending between the first and second vertical supports 130. The lateral support stop 132 may be coupled to each of the first and second vertical supports 130 generally halfway between the perimeter rail 106 of the base frame 104 and the lower containment rail 118. The easel support cage 102 may further include an upper containment rail lateral support stop 134 extending between the lengthwise rail sections 120L of the upper containment rail 120. The upper containment rail lateral support stop 134 may be located generally halfway between the widthwise rail sections 120W of the upper containment rail 120.

Referring now to FIGS. 17A-18B, one benefit of the lateral support stop 132 and the upper containment rail lateral support stop 134 may be that the lateral support stop 132 and the upper containment rail lateral support stop 134 prevent the conventional easels 10 from falling over when they are placed in the easel support cage 102. In certain optional embodiments of the transportation cart 100, a single conventional easel 10 placed within the easel support cage 102 may fall flat if not for the lateral support stop 132 and the upper containment rail lateral support stop 134.

If the embodiment of the transportation cart 100 that is operable to hold up to twelve (12) conventional easels does not include the lateral support stop 132 nor the upper containment rail lateral support stop 134, a single conventional easel 10 may fall flat. In this embodiment, the length 110 of the base frame 104, the length 124 of the lower containment rail 118, and the length 128 of the upper containment rail 120 may each be 40 inches. The height 129 of the easel support cage 102 may be 32 inches. Thus, a first diagonal distance between one of the widthwise rail sections 106W of the base frame 104 and the widthwise rail section 120W of the upper containment rail 120 on an opposite side of the easel support cage 102 may be about 51 inches.

Conventional easels 10 typically have a height 34 of about 43 inches when the easel 10 is in the transportation configuration. Therefore, if a single conventional easel 10 is placed in the easel support cage 102 and the lower end 22 of the base structure 14 is located generally near one of the widthwise rail sections 106W of the base frame 104, the conventional easel 10 could fall flat within the easel support cage 102. A user would then have to stand the conventional easel 10 back upright, hold the conventional easel 10 in place, and load additional conventional easels 10 into the easel support cage 102 until enough conventional easels 10 are present to prevent the conventional easels 10 from falling over.

Figure 17A:
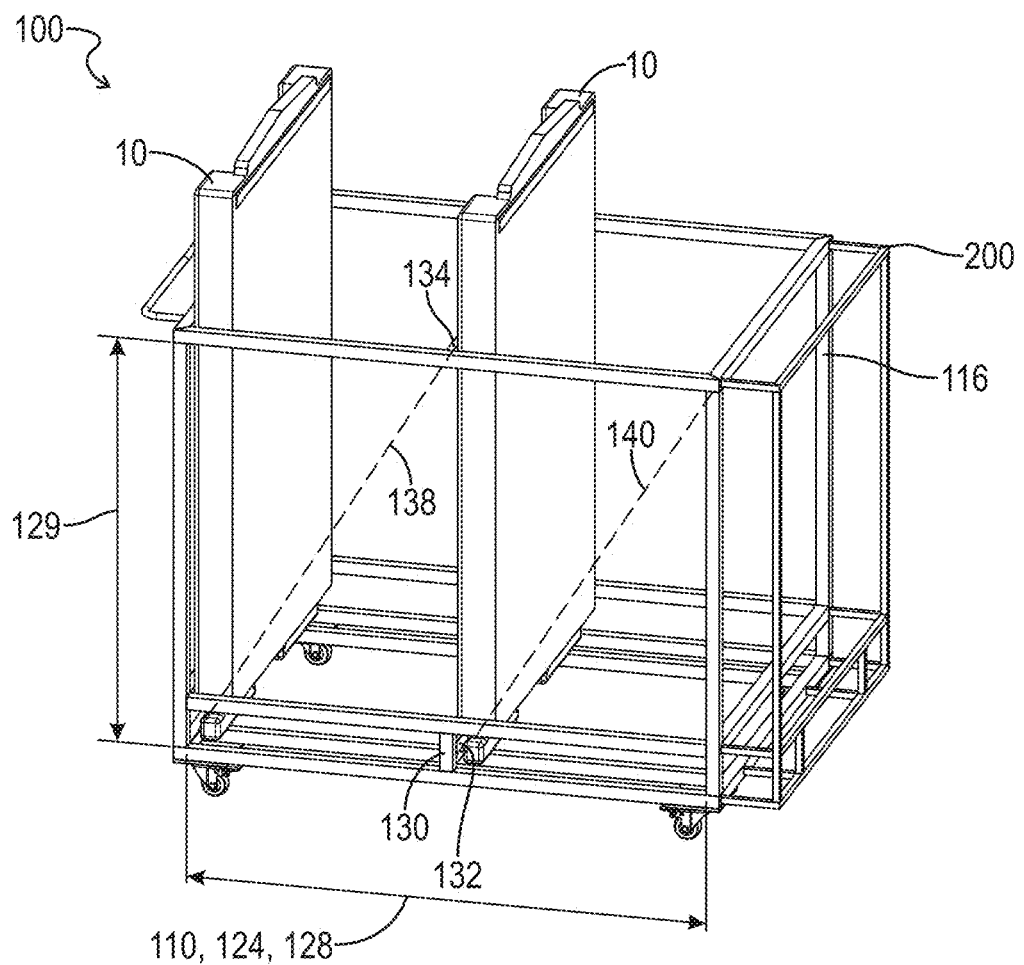
FIG. 17A is a perspective view of the transportation cart of FIG. 4 in accordance with the present disclosure wherein the transportation cart is supporting the plurality of conventional easels.
Figure 17B:
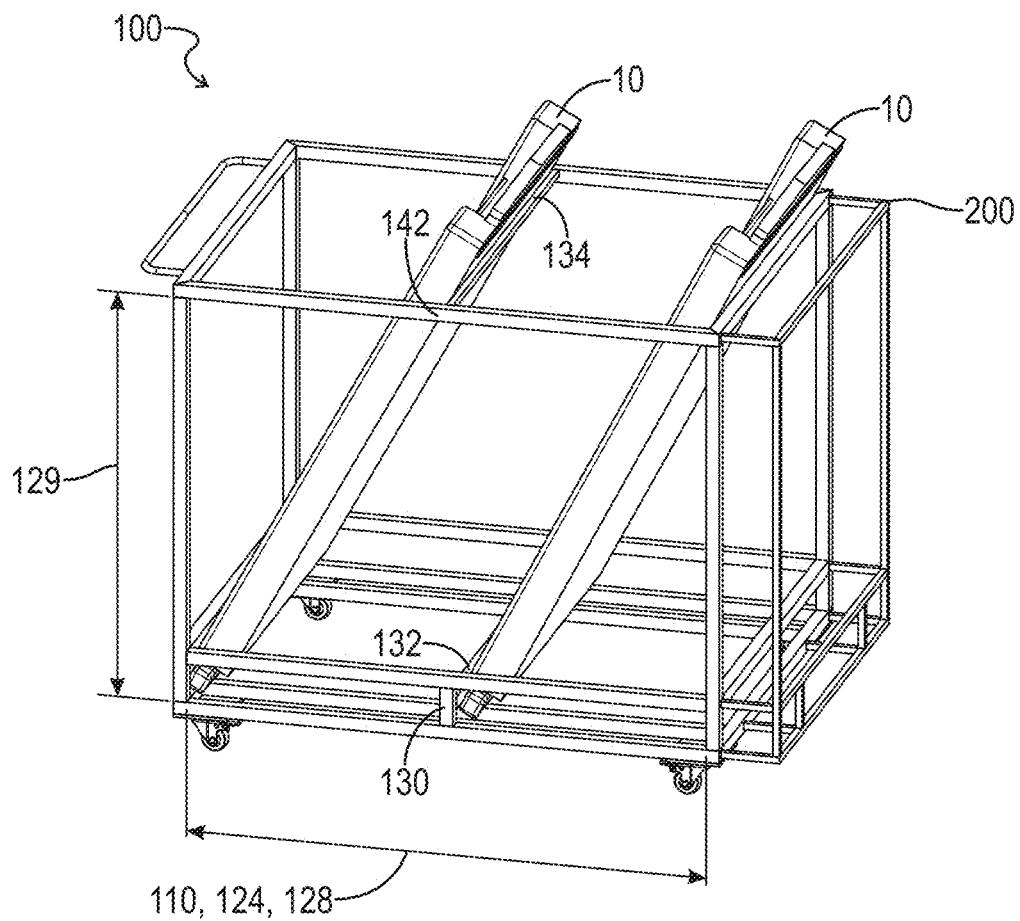
FIG. 17B is a perspective view of the transportation cart of FIG. 4 in accordance with the present disclosure wherein the transportation cart is supporting the plurality of conventional easels.

FIGS. 17A-17B illustrate the optional embodiment of the transportation cart 100 operable to hold up to twelve (12) conventional easels 10. This embodiment may include the lateral support stop 132 and the upper containment rail lateral support stop 134. In this embodiment, the length 110 of the base frame 104, the length 124 of the lower containment rail 118, and the length 128 of the upper containment rail 120 may each be 40 inches. The lateral support stop 132 and the upper containment rail lateral support stop 134 may be located halfway between the widthwise rail sections 106W of the base frame 104. The height 129 of the easel support cage 102 may be 32 inches. A second diagonal distance 138 between one of the widthwise rail sections 106W of the base frame 104 and the upper containment rail lateral support stop 134 is roughly 37 inches. A third diagonal distance 140 between a middle 142 of the lengthwise rail section 106L of the base frame 104 and the widthwise rail section 120W of the upper containment rail 120 is roughly 37 inches. Therefore, as shown in FIG. 17B, if a single conventional easel 10 is placed in the easel support cage 102, the conventional easel 10 will not fall flat within the easel support cage 102. The conventional easel 10 would contact the upper containment rail lateral support stop 134 or the widthwise rail section 120W, and thus be prevented from falling flat.

Figure 18A:
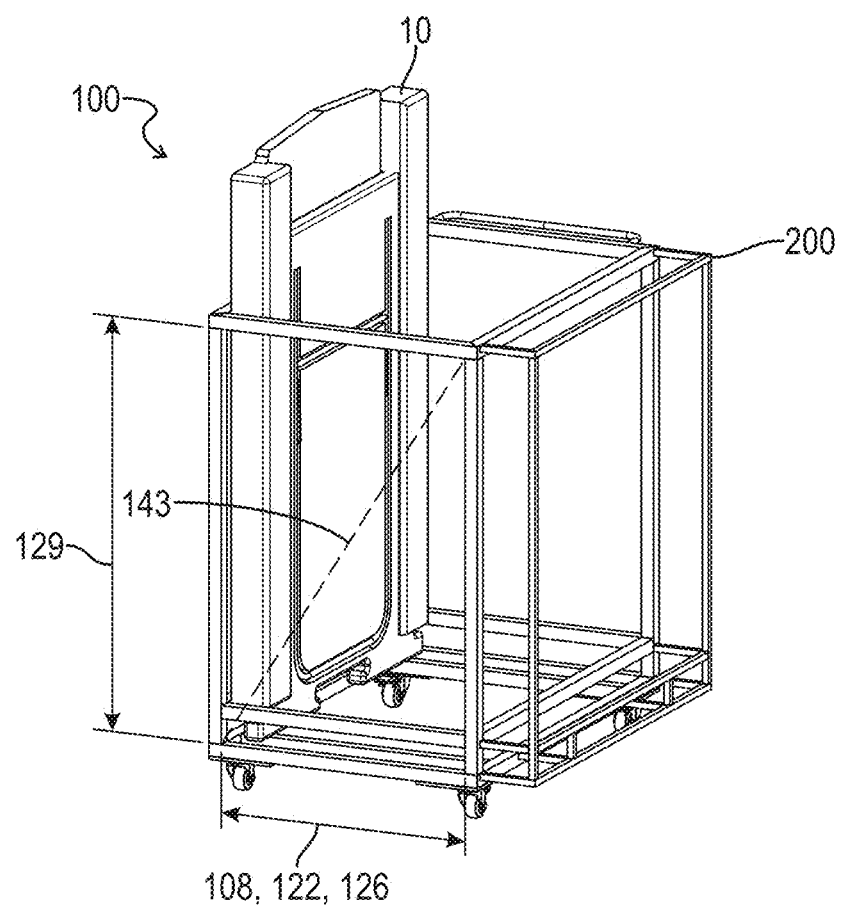
FIG. 18A is a perspective view of the transportation cart of FIG. 11 in accordance with the present disclosure wherein the transportation cart is supporting the conventional easel.
Figure 18B:
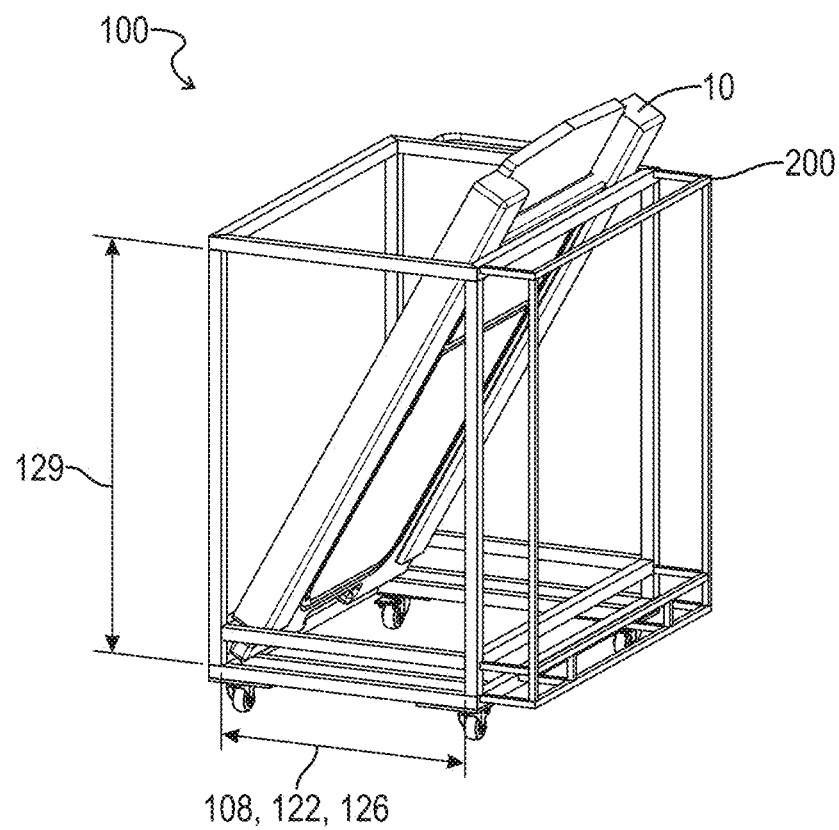
FIG. 18B is a perspective view of the transportation cart of FIG. 11 in accordance with the present disclosure wherein the transportation cart is supporting the conventional easel.

FIGS. 18A-18B illustrate the optional embodiment of the transportation cart 100 operable to hold up to six (6) conventional easels 10. This embodiment may not include the lateral support stop 132 nor the upper containment rail lateral support stop 134. In this embodiment, the width 108 of the base frame 104, the width 122 of the lower containment rail 118, and the width 126 of the upper containment rail 120 may each be 20 inches. The height 129 of the easel support cage 102 may be 32 inches. A fourth diagonal 143 between one of the lengthwise rail sections 106L of the base frame 104 and the lengthwise rail section 120L of the upper containment rail 120 on an opposite side of the easel support cage 102 is about 37 inches. Therefore, as shown in FIG. 18B, if a single conventional easel 10 is placed in the easel support cage 102 and the lower end 22 of the base structure 14 is located generally at one of the lengthwise rail sections 106L of the base frame 104, the conventional easel 10 will not fall flat within the easel support cage 102. The conventional easel 10 would contact the lengthwise rail section 120L of the upper containment rail 120.

The easel support cage 102 may include one or more handles 144 configured to be grasped by a user to push or pull the transportation cart 100. The one or more handles 144 may be located on any side of the easel support cage 102. The one or more handles 144 may be located closer to the upper containment rail 120 than to the lower containment rail 118.

The transportation cart 100 may further include at least one paper pad containment cage 200 attached to the easel support cage 102. The paper pad containment cage 200 may be operable to support at least one paper pad 12, or alternatively a box of paper pads 12.

The at least one paper pad containment cage 200 may include a bottom perimeter rail 202, a middle perimeter rail 204, and a top perimeter rail 206. Two vertical posts 208 may extend up from the bottom perimeter rail 202. Each of the two vertical posts 208 may be attached to a corner of the bottom perimeter rail 202. The middle perimeter rail 204 may be located a distance above the bottom perimeter rail and attached to the two vertical posts 208. The top perimeter rail 206 may be located a distance above the middle perimeter rail 204 and attached to the two vertical posts 208.

The bottom perimeter rail 202 may be located closer to the base frame 104 of the easel support cage 102 than to the lower containment rail 118 of the easel support cage 102. Further, the bottom perimeter rail 202 may be connected to the base frame 104 of the easel support cage 102. The middle perimeter rail 204 may be located closer to the lower containment rail 118 of the easel support cage 102 than to the base frame 104 or upper containment rail 120 of the easel support cage 102. Further, the middle perimeter rail 204 may be connected to the lower containment rail 118 of the easel support cage 102. The top perimeter rail 206 may be located closer to the upper containment rail 120 of the easel support cage 102 than to the lower containment rail 118 of the easel support cage 102. Further, the top perimeter rail 206 may be connected to the upper containment rail 120 of the easel support cage 102.

The paper pad containment cage 200 may further include at least two lateral supports 210 extending from the easel support cage 102 to the bottom perimeter rail 202. The at least two lateral supports 210 may be operable to support one or more paper pads 12 when they are placed within the paper pad containment cage 200. The paper pad containment cage 200 may further include at least two vertical supports 212 extending up from the bottom perimeter rail 202 to the middle perimeter rail 204. The at least two vertical supports 212 may be operable to prevent the paper pad 12 from sliding between the bottom perimeter rail 202 and the middle perimeter rail 204, and thus sliding out of the paper pad containment cage 200.

The bottom perimeter rail 202, the middle perimeter rail 204, and the top perimeter rail 206 may each extend from the easel support cage 102 an equal distance. This distance may be referred to as a length 214 of the paper pad containment cage 200. The overall length of the easel support cage 102 may be at least six (6) times the length 214 of the paper pad containment cage 200. For example, in optional embodiments such as the embodiment operable to hold up to twelve (12) conventional easels 10, the overall length of the easel support cage may be 40 inches and the length 214 of the paper pad containment cage 200 may be 4 inches (4 inches× six (6)=24 inches which is less than 40 inches). In another example, in optional embodiments such at the embodiment operable to hold up to six (6) conventional easels 10, the overall length of the easel support cage may be 30 inches and the length 214 of the paper pad containment cage 200 may be 4 inches (4 inches×six (6)=24 inches which is less than 30 inches). The length 214 of the paper pad containment cage 200 may be in a range of from 1 inches to 7 inches, preferably from 2 inches to 6 inches, and most preferably from 3 inches to 5 inches. The paper pad containment cage 200 may have a width 216 in a range of from 24 inches to 36 inches, preferably from 26 inches to 34 inches, and most preferably from 28 inches to 32 inches.

The transportation cart 100 may include steel tubing. The entirety of the transportation cart 100 may include one thickness of tubing. Alternatively, the base frame 104, the four corner posts 116, the lower containment rail 118, the upper containment rail 120, the first and second vertical supports 130, and the lateral support stop 132 may include steel tubing that is thicker than the steel tubing of the upper containment rail lateral support stop 134, the handle 144 and the paper pad containment cage 200. The base frame 104, the four corner posts 116, the lower containment rail 118, the upper containment rail 120, the first and second vertical supports 130, and the lateral support stop 132 may include 1 inch thick tubing while the upper containment rail lateral support stop 134, the handle 144 and the paper pad containment cage 200 include 0.5 inch thick steel tubing.

While certain features have been described in relation to the optional embodiment of the transportation cart 100 operable to hold up to six (6) conventional easels 10 or in relation to the optional embodiment of the transportation cart 100 operable to hold up to twelve (12) conventional easels 10, it should be understood that various features could be applicable to either of the optional embodiments mentioned as well as other optional embodiments not mentioned.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A transportation cart configured to transport a plurality of easels, the transportation cart comprising:
    an easel support cage including:
        a base frame including a perimeter rail and at least two interior support rails;
        four corner posts extending up from the base frame, each of the four corner posts attached to a corner of the base frame;
        a plurality of wheels for supporting the easel support cage from a ground surface;
        a lower containment rail located a distance above the base frame and attached to the four corner posts;
        an upper containment rail located a distance above the lower containment rail and attached to the four corner posts; and
    at least one paper pad containment cage attached to the easel support cage and operable to support at least one paper pad, the at least one paper pad containment cage including:
        a bottom perimeter rail;
        two vertical posts extending up from the bottom perimeter rail, each of the two vertical posts attached at a corner of the bottom perimeter rail;
        a middle perimeter rail located a distance above the bottom perimeter rail and attached to the two vertical posts;
        a top perimeter rail located a distance above the middle perimeter rail and attached to the two vertical posts:
        at least two lateral supports extending from the easel support cage to the bottom perimeter rail; and
        at least two vertical supports extending from the bottom perimeter rail to the middle perimeter rail;
    wherein a length of the easel support cage is at least six (6) times a distance that the at least one paper pad containment cage extends from the easel support cage.

2. The transportation cart of claim 1, wherein the easel support cage further includes:
    first and second vertical supports extending from the perimeter rail of the base frame to the lower containment rail; and
    a lateral support stop extending from the first vertical support to the second vertical support.

3. The transportation cart of claim 1, wherein:
    the bottom perimeter rail of the paper pad containment cage is connected to the base frame of the easel support cage, the middle perimeter rail of the paper pad containment cage is connected to the lower containment rail of the easel support cage, and the top perimeter rail of the paper pad containment cage is connected to the upper containment rail of the easel support cage.

4. The transportation cart of claim 1, further comprising:
    a handle coupled to the easel support cage.

5. The transportation cart of claim 1, wherein:
    the lower containment rail of the easel support cage has an opening width in a range of from 24 inches to 36 inches.

6. The transportation cart of claim 1, wherein:
    the lower containment rail of the easel support cage has an opening width in a range of from 14 inches to 26 inches.

7. The transportation cart of claim 1, wherein:
    the lower containment rail of the easel support cage has an opening length in a range of from 34 inches to 46 inches.

8. The transportation cart of claim 1, wherein:
    the lower containment rail of the easel support cage has an opening length in a range of from 24 inches to 36 inches.

9. The transportation cart of claim 1, wherein:
    the upper containment rail of the easel support cage has an opening width in a range of from 24 inches to 36 inches.

10. The transportation cart of claim 1, wherein:
    the upper containment rail of the easel support cage has an opening width in a range of from 14 inches to 26 inches.

11. The transportation cart of claim 1, wherein:
    the upper containment rail of the easel support cage has an opening length in a range of from 34 inches to 46 inches.

12. The transportation cart of claim 1, wherein:
    the upper containment rail of the easel support cage has an opening length in a range of form 24 inches to 36 inches.

13. The transportation cart of claim 1, wherein:
    a distance between the base frame of the easel support cage and the upper containment rail of the easel support cage is in a range of from 26 inches to 38 inches.

14. The transportation cart of claim 1, wherein:
    a length of the base frame of the easel support cage, a length of the lower containment rail of the easel support cage, and a length of the upper containment rail of the easel support cage are each equal and a width of the base frame of the easel support cage, a width of the lower containment rail of the easel support cage, and a width of the upper containment rail of the easel support cage are each equal.

15. The transportation cart of claim 1, wherein the easel support cage further includes:

an upper containment rail lateral support stop extending from a first lengthwise side of the upper containment rail to a second lengthwise side of the upper containment rail.

16. The transportation cart of claim 1, wherein:
a length of the at least one paper pad containment cage is in a range of from 1 inches to 7 inches.

17. The transportation cart of claim 1, wherein:
the at least one paper pad containment cage has a width in a range of from 24 inches to 36 inches.

18. The transportation cart of claim 2, further comprising:
at least one easel supported by the easel support cage, wherein the lateral support stop is configured to restrict movement of the at least one easel.

19. The transportation cart of claim 1, further comprising:
at least one paper pad supported by the at least one paper pad containment cage.

\* \* \* \* \*